Sept. 30, 1941.  O. W. VANDINE  2,257,403
LIVE BAIT HOLDER
Filed April 30, 1941  2 Sheets-Sheet 1

Inventor
Oliver W. Vandine

By Clarence A. O'Brien

Attorney

Inventor
Oliver W. Vandine

By Clarence A. O'Brien

Attorney

Patented Sept. 30, 1941

2,257,403

UNITED STATES PATENT OFFICE 2,257,403

LIVE BAIT HOLDER

Oliver W. Vandine, Lead, S. Dak.

Application April 30, 1941, Serial No. 391,177

2 Claims. (Cl. 43—40)

This invention relates to a live bait holder, the general object of the invention being to provide means for gripping a minnow or other live bait in such a manner that the minnow can move and will live for a long time, with hook means associated with the holder whereby a fish striking the minnow will be caught by the hook.

Another object of the invention is to provide means whereby a trolling hook may be connected with the device.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 1:
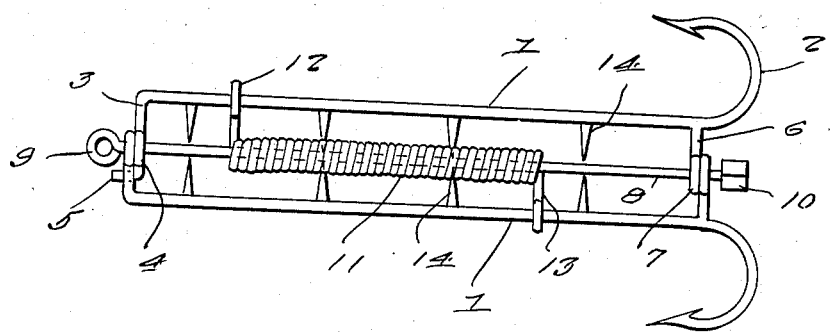
Figure 1 is a top plan view of the invention.

In these views the numeral 1 indicates a pair of rod-like members having a fish hook 2 at one end of each member with the other end bent at right angles as shown at 3 and then formed into an eye 4. One of the eyes is formed with an extension 5 for engaging the opposite part 3 to act as a stop as will be hereinafter described. An inwardly extending arm 6 is formed on each member 1 adjacent the hook 2 and the extremities of these members 6 are bent to provide the eyes 7. The eyes 4 and 7 overlap and a hinge pin 8 passes through the eyes to hingedly connect the two members 1 together. An eye 9 is formed on one end of the pin after the same has been passed through the eyes and a socket nut 10 is connected with the other end of the pin. A coiled spring 11 encircles a part of the pin and has one arm 12 connected to one of the members 1 and another arm 13 connected to the opposite member 1, this spring tending to close the members 1 to a point where the stop 5 will engage an arm 3 which holds the parts in substantially the position shown in Figure 3. Curved hooks or points 14 are connected with the parts 1 curved toward each other as shown in Figure 3, these points being adapted to grip a minnow or other live bait as shown in dotted lines in Figure 2. As shown in this figure the device extends parallel to the bait over the top of the same with the points 14 engaging the upper portion of the bait so as to hold the bait in a life-like position. Of course, the line is connected with the eye 9 and when a fish strikes at the minnow or live bait the chances are that the fish will be caught by both or either one of the hooks 2.

The nut 10 has a threaded socket therein for receiving the threaded end of a rod 15, a lock nut 16 holding the rod to the nut. The rod 15 is formed with an eye 17 at its opposite end for receiving the eye of a trolling hook 18 preferably of the triple form shown.

Figure 2:
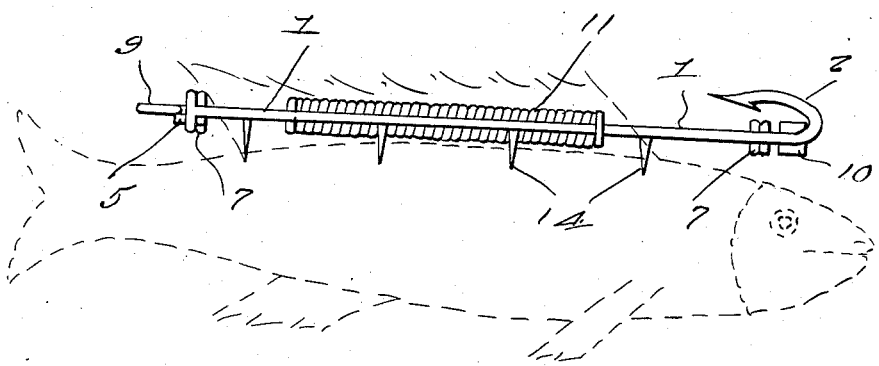
Figure 2 is an elevational view showing a minnow attached thereto, the minnow being shown in dotted lines.
Figure 3:
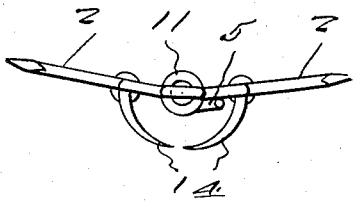
Figure 3 is an end view of the device.
Figure 4:
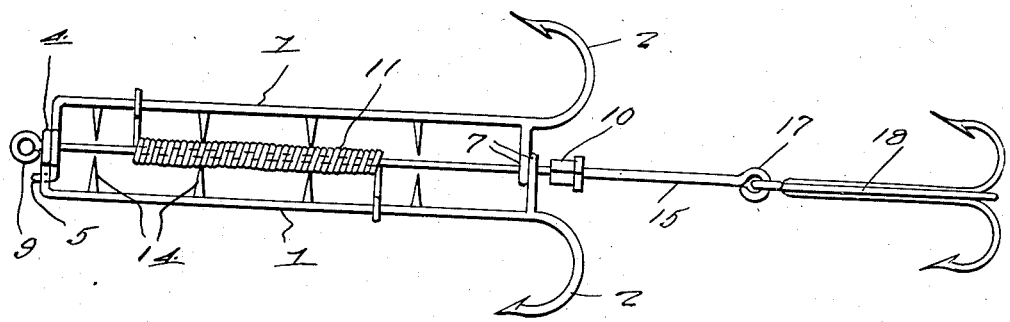
Figure 4 is a view similar to Figure 1 but showing the trolling attachment connected with the device.
Figure 5:
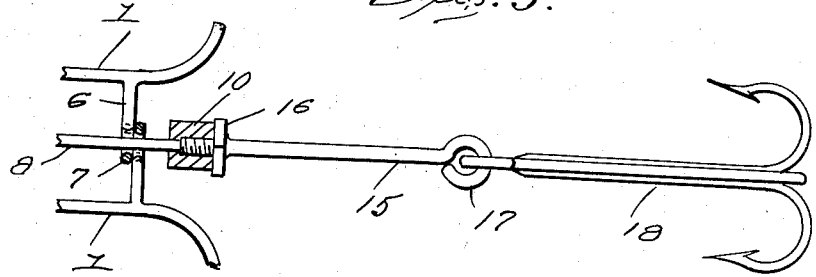
Figure 5 is a fragmentary detail view showing how the trolling device is attached to the minnow holder.
Figure 6:
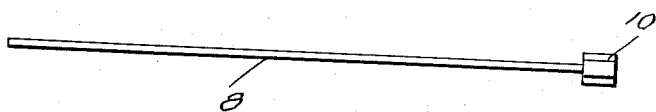
Figure 6 is a view of the rod used as a hinge pin hinged together to two parts of the device.

As shown in Figure 2, the device is preferably attached to the dorsal fin of the bait with the hook adjacent the head of the bait though the angler, of course, can fasten the device to the bait in any way that he desires.

Due to the fact that the points do not have to be inserted very deep in the minnow to secure a good hold, longer life for the minnow results and it can be cast a considerable distance without throwing the minnow off the device. As will be seen the bait can be cast with the head first without line interference.

As before stated, the minnow can be attached to the device either head first or tail first, just as the angler desires.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A bait holder comprising a pair of rods having parts extending toward each other and terminating in eyes, a rod passing through the eyes and hingedly connecting the parts together, downwardly and inwardly curved hooks carried by the rods for engaging live bait without killing the same, a spring for causing the points to engage the bait, and a fish hook connected with a rod.

2. A bait holder comprising a pair of rods having parts extending toward each other and terminating in eyes, a rod passing through the eyes and hingedly connecting the parts together, downwardly and inwardly curved hooks carried by the rods for engaging live bait without killing the same, a spring for causing the points to engage the bait, a hook on one end of each rod, a short rod detachably connected to the hinge rod and an eye at the outer end of the rod for receiving a trolling hook.

OLIVER W. VANDINE.